United States Patent [19]
Ander et al.

[11] Patent Number: 5,870,542
[45] Date of Patent: Feb. 9, 1999

[54] SECURITY APPARATUS AND METHOD FOR A DATA PROCESSING SYSTEM

[75] Inventors: S. Dale Ander, Dallas; Christopher Von See, Garland, both of Tex.

[73] Assignee: Sterling Commerce, Inc., Dallas, Tex.

[21] Appl. No.: 580,136

[22] Filed: Dec. 28, 1995

[51] Int. Cl.[6] ........................................... H04L 9/00
[52] U.S. Cl. ................................. 395/186; 395/187.01
[58] Field of Search ............................ 395/186, 187.01, 395/188.01, 200.03, 200.06, 438, 479, 490, 726, 200.33, 200.42, 200.43, 200.47, 200.49, 200.57; 380/4, 23, 25; 364/222.5; 711/111, 152, 163

[56] References Cited

U.S. PATENT DOCUMENTS

| | | | |
|---|---|---|---|
| 5,012,405 | 4/1991 | Nishikado et al. ...................... | 395/608 |
| 5,151,989 | 9/1992 | Johnson et al. ......................... | 395/610 |
| 5,414,852 | 5/1995 | Kramer et al. .......................... | 395/674 |
| 5,437,029 | 7/1995 | Sinha ....................................... | 395/616 |
| 5,444,848 | 8/1995 | Johnson, Jr. et al. ............. | 395/200.15 |
| 5,560,008 | 9/1996 | Johnson et al. ......................... | 395/680 |
| 5,655,101 | 8/1997 | O'Farrell et al. ....................... | 711/148 |
| 5,745,703 | 4/1998 | Cejtin et al. ...................... | 395/200.68 |
| 5,758,083 | 5/1998 | Singh et al. ....................... | 395/200.53 |

*Primary Examiner*—Dieu-Minh Le
*Attorney, Agent, or Firm*—Baker & Botts, L.L.P.

[57] ABSTRACT

A data processing system (10) includes processing nodes (12, 18) and submitting nodes (14, 16, 20, 22). Each processing node (12, 18) includes a list of remote proxies (36, 50) and a list of local proxies (38, 52). The remote proxies (36, 50) and local proxies (38, 52) specify access to the storage or processing capabilities of the processing nodes (12, 18) by the submitting nodes (14, 16, 20, 22).

19 Claims, 2 Drawing Sheets

SECURITY APPARATUS AND METHOD FOR A DATA PROCESSING SYSTEM

TECHNICAL FIELD OF THE INVENTION

This invention relates in general to the field of data processing systems, and more specifically to a security apparatus and method for a data processing system.

BACKGROUND OF THE INVENTION

Many data processing systems include a collection of interconnected devices. The storage and processing capabilities of these systems may be distributed among these interconnected devices. A user at a first device in a system of this type may desire to access the storage or processing capabilities of a second device in the system.

As data processing systems become larger and more complex to serve a variety of users, system administrators may desire to restrict access to the storage and processing capabilities of the system devices. A known security technique allows users unrestricted access to system devices upon furnishing appropriate access information, such as an identifier and a password. However, unauthorized users may thwart this security technique by appropriating the access information. Furthermore, this security technique may not provide user-specific access designations.

SUMMARY OF THE INVENTION

In accordance with the present invention, the disadvantages and problems associated with security in a data processing system have been substantially reduced or eliminated.

In accordance with one embodiment of the present invention, a processing system includes a submitting node having an identifier. A processing node is coupled to the submitting node and includes a memory that stores a proxy associated with the submitting node. The proxy specifies a location in the memory of the processing node accessible by the submitting node. The processing node receives the identifier of the submitting node and provides the submitting node access to the processing node in accordance with the proxy.

Important technical advantages of the present invention include maintaining at a processing node a proxy for a submitting node desiring to access the storage or processing capabilities of the processing node. The proxy includes one or more access parameters that may specify a location in the memory of the processing node that is accessible by the submitting node. The access parameters may be stored as a proxy associated with a submitting node or a user of a submitting node. Another important technical advantage includes providing both a remote proxy and a local proxy to specify the access parameters of the submitting node. In one embodiment, first access parameters specified in a remote proxy take precedence over second access parameters specified in a local proxy. In this manner, the local proxy establishes baseline access parameters for a class of users and the remote proxy designates user-specific access parameters.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

Figure 1:
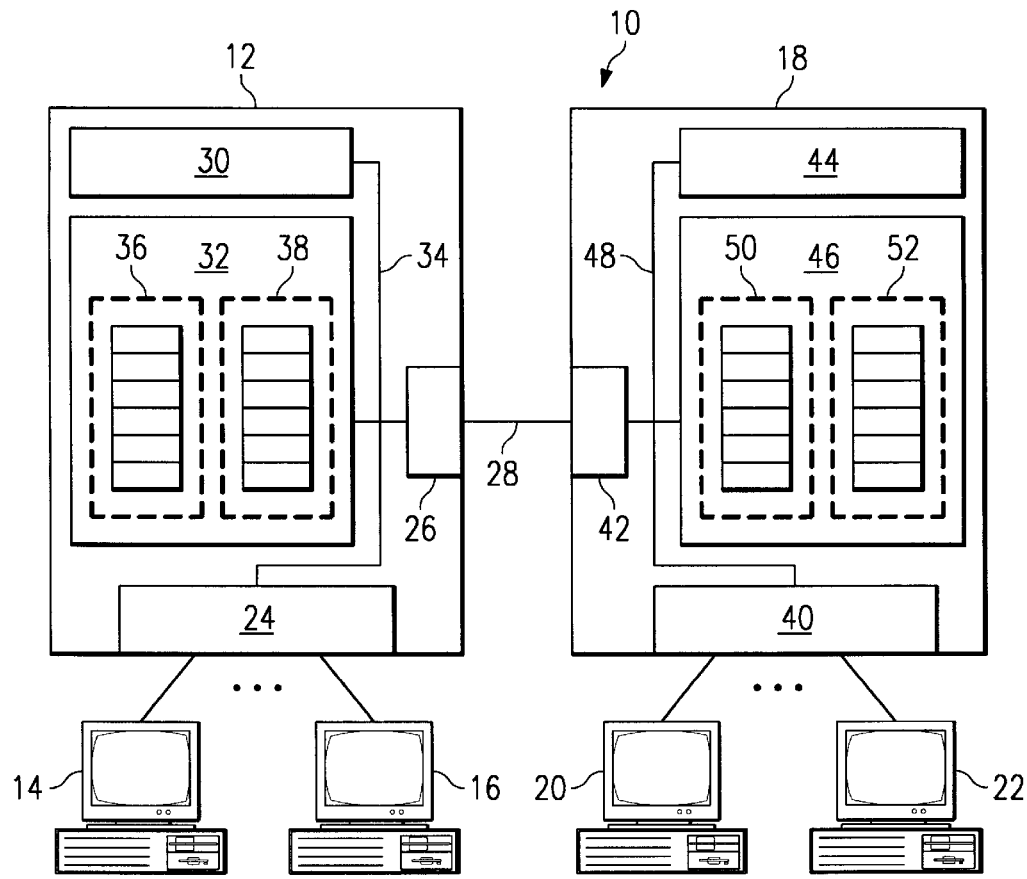
FIG. 1 illustrates a data processing system constructed according to the teachings of the present invention.

FIG. 1 illustrates a data processing system 10 that includes a processing node 12 coupled to submitting nodes 14 and 16, and a processing node 18 coupled to submitting nodes 20 and 22. In one embodiment, processing nodes 12 and 18 may be two separate data processing systems coupled by a link. Both processing nodes 12 and 18 and submitting nodes 14, 16, 20, and 22 are referred to generally as devices. Submitting nodes 14, 16, 20, and 22 desire to access processing nodes 12 and 18. In general, system 10 manages the allocation of and access to the storage and processing capabilities of processing nodes 12 and 18.

Submitting nodes 14, 16, 20, and 22 may be computers or other devices with storage and processing capabilities, but may also be terminals or other input/output devices without significant local storage or processing capabilities. Submitting nodes 14, 16, 20, and 22, although shown illustratively as separate devices, may also be programs or instructions operating on processing nodes 12 and 18. In general, submitting nodes 14, 16, 20, and 22 may be any logical entity in hardware and/or software, separate or integral to its associated processing node 12 or 18, that provides access to the storage and processing capabilities of processing nodes 12 and 18.

Processing node 12 is coupled to submitting nodes 14 and 16 using a first interface circuit 24. A second interface circuit 26 couples processing node 12 to processing node 18 using link 28. A processor 30 and a memory 32 are coupled to first interface circuit 24 and second interface circuit 26 using bus 34.

Memory 32 may be any suitable memory, such as dynamic or static random access memory (RAM), read only memory (ROM), magnetic media, optical media, CD-ROM, or other suitable volatile or non-volatile storage media. Memory 32 stores information in files, directories, or any other suitable arrangement that may be accessed by first interface circuit 24, second interface circuit 26, or processor 30. Memory 32 contains instructions for execution by processor 30 to manage the operation of processing node 12.

Memory 32 also contains lists of proxies that specify user access to storage and processing capabilities of processing node 12. A proxy comprises one or more access parameters associated with a device or user of a device in system 10. Access parameters may include read and write authorizations, processing authorizations, file or directory specifications, file allocation limitations, processing allocation limitations, or any other information that specifies access to or availability of the storage and processing capabilities of processing node 12.

Access parameters residing in memory 32 of processing node 12 may be arranged in a list of remote proxies 36 and a list of local proxies 38, which are described in more detail with reference to FIG. 2. Remote proxies 36 are associated with devices in system 10 that are serviced remotely by processing node 12, such as processing node 18 and submitting nodes 20 and 22. Local proxies 38 are associated with devices that are serviced locally by processing node 12, such as submitting nodes 14 and 16. Local proxies 38 may also be associated with direct users of processing node 12 that do not operate a submitting node. Remote proxies 36 and local proxies 38 may also be associated with programs and instructions operating on processing nodes 12 and 18. Remote proxies 36 and local proxies 38 may, in addition to or instead of their association with a device, be associated with the user of the device.

Processing node 18 is coupled to submitting nodes 20 and 22 using a first interface circuit 40. A second interface circuit 42 couples processing node 18 to processing node 12 using link 28. A processor 44 and a memory 46 are coupled to first interface circuit 40 and second interface circuit 42 using a bus 48.

Memory 46 may be any suitable storage media as discussed above with reference to memory 32 in processing node 12. Memory 46 stores information in files, directories, or any other suitable arrangement that may be accessed by first interface circuit 40, second interface circuit 42, or processor 44. Memory 46 contains instructions for execution by processor 44 to manage the operation of processing node 18.

Memory 46 also contains a list of proxies that specify user access to storage and processing capabilities of processing node 18. Each proxy comprises one or more access parameters associated with a device or user of a device in system 10. Access parameters may be arranged in a list of remote proxies 50 and a list of local proxies 52. Remote proxies 50 are associated with devices that are serviced remotely by processing node 18, such as processing node 12 and submitting nodes 14 and 16. Local proxies 52 are associated with devices serviced locally by processing node 18, such as submitting nodes 20 and 22. Local proxies 52 may also be associated with direct users of processing node 18 that do not operate a submitting node. Remote proxies 50 and local proxies 52 may also be associated with programs and instructions operating on processing nodes 12 and 18. Remote proxies 50 and local proxies 52 may, in addition to or instead of their association with a device, be associated with the user of the device.

In operation, system 10 manages the allocation of and access to the storage and processing capabilities of processing nodes 12 and 18. In one embodiment, submitting nodes 14, 16, 20, and 22 may desire to log into or interact with processing nodes 12 and 18. Submitting nodes 14, 16, 20, and 22 may generate instructions to be executed by processing nodes 12 and 18. These instructions may be arranged as a process to be executed on processing nodes 12 and 18 or may be generated by the user of a submitting node while interacting with a processing node. Instructions generated by submitting nodes 14, 16, 20, and 22 may include commands to run a job or task, copy files, submit additional processes, or perform any other suitable task at processing nodes 12 and 18.

The instructions or processes submitted include an identifier of the submitting node or the user of the submitting node that is specified either indirectly in the transmission or directly by a specific identification statement. Processing nodes 12 and 18 use the identifier to retrieve remote proxies and local proxies associated with the submitting node or the user of the submitting node and utilize these proxies to restrict access to their storage and processing capabilities.

For example, submitting node 14 may be any logical entity in hardware and/or software, whether integral to or separate from processing node 12, that desires to access the storage and processing capabilities of processing node 12. In the embodiment where submitting node 14 is separate from processing node 12, the identifier of submitting node 14 is communicated to first interface circuit 24 of processing node 12. In response to receiving the identifier, processing node 12 retrieves a local proxy 38 stored in memory 32 that is associated with submitting node 14 or the user of submitting node 14. The proxy includes access parameters specifying, for example, a location in memory 32 of processing node 12 that may be accessed by submitting node 14. Processing node 12 then provides submitting node 14 access to its storage and processing capabilities in accordance with the access parameters specified in local proxy 38.

In another example, submitting node 16 having an identifier desires to access processing node 18. The identifier is communicated to first interface circuit 24 of processing node 12, which then communicates the identifier to second interface circuit 26 using bus 34. If processing node 12 is not already referenced in the identifier received from submitting node 16, processing node 12 may modify or supplement the identifier of submitting node 16 to include an identification of processing node 12. In a specific embodiment, the identifier of submitting node 16 comprises a first identifier associated with submitting node 16 and a second identifier associated with processing node 12. For example, if the name of submitting node 16 is "MIKE" and the name of processing node 12 is "REMOTE," then the identifier could be "MIKE@REMOTE."

The identifier generated by submitting node 16 and optionally modified or supplemented by processing node 12 is then communicated over link 28 to second interface circuit 42 of processing node 18. Upon receiving the identifier, processing node 18 accesses a remote proxy 50 stored in memory 46 that is associated with submitting node 16 or the user of submitting node 16. In one embodiment, processing node 18 provides submitting node 16 access to its storage and processing capabilities in accordance with the access parameters specified in remote proxy 50.

Submitting node 16 may provide information to processing node 18 to override the mechanism for determining a proxy. In this case, the remote proxy 50 at processing node 18 is bypassed and either the local proxy 52 at processing node 18 is used, or no proxy at all. The specific local proxy 52 to be used is determined by the override information provided by submitting node 16. In a specific embodiment, the override information is specified using an "SNODEID" or "REMOTEID" statement.

In another embodiment, remote proxy 50 associated with submitting node 16 or the user of submitting node 16 includes a local identifier. The local identifier is associated with a local proxy 52 that establishes one or more baseline access parameters. Remote proxy 50 may then supply one or more access parameters that further specify or modify the access parameters in local proxy 52. In this manner, processing node 18 maintains a template or baseline access parameters specified in local proxy 52 that apply to a class of users such as remote guests, or a class of devices such as devices serviced locally by processing node 12. This template may be further customized by access parameters in remote proxy 50 associated with a specific submitting node 16 or a specific user of submitting node 16.

Both remote proxies 50 and local proxies 52 may be either specific or general in their association with a submitting node. A specific remote proxy 50 may be associated, for example, with submitting node 16 that has an identifier "MIKE@REMOTE." In contrast, a general remote proxy 50 may apply to any submitting node that desires access to processing node 18. In the specific embodiment where the submitting node 16 is identified using a first and second identifier, processing node 18 may maintain a specific proxy, either remote or local, that matches both the first identifier and the second identifier, a more general proxy that matches the first identifier or the second identifier, or the most general proxy that applies to all submitting nodes 16. In this manner, specific and general proxies provide flexibility to associate groups of users with defined access parameters.

Processing nodes 12 and 18 may also desire to access the storage or processing capabilities of another device in system 10. For example, processing node 12 having an identifier may desire to access processing node 18. Upon receiving the identifier, processing node 18 accesses a remote proxy 50 associated with processing node 12 or a user of processing node 12, and optionally a local proxy 52, and determines the pertinent access parameters. The present invention contemplates both local or remote access of one device by another device in system 10.

Figure 2:
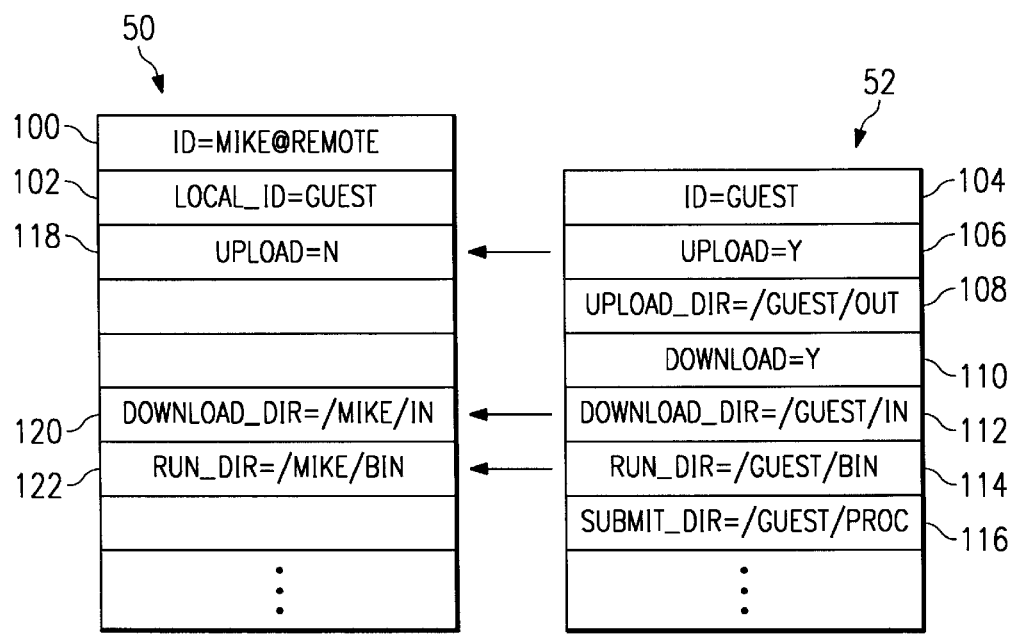
FIG. 2 illustrates a remote proxy and a local proxy used in a data processing system constructed according to the teachings of the present invention.

FIG. 2 illustrates the content of remote proxy 50 and local proxy 52 stored in memory 46 on processing node 18. For purposes of discussion, remote proxy 50 and local proxy 52 are associated with a user of submitting node 16 that desires to access processing node 18. For example, the user of submitting node 16 may desire to log into or interact with processing node 18. The user of submitting node 16 may submit, either interactively or in batch, instructions or processes for execution on processing node 18. Remote proxy 50 includes an identifier 100 that identifies the user of submitting node 16. For example, the identifier "MIKE@REMOTE" specifies that the user of submitting node 16 is named "MIKE" and processing node 12 is named "REMOTE". Remote proxy 50 also includes a local identifier 102 that associates the user of submitting node 16 with local proxy 52.

Upon receiving the identifier of the user of submitting node 16, processing node 18 relates the user of submitting node 16 to a local identifier 102. The translation of a remote user "MIKE@REMOTE" to a valid local user "GUEST" provides an additional level of security since neither submitting node 16 nor processing node 12 have access to local identifier 102 maintained at processing node 18. Any additional security mechanism allowed for "GUEST" by processing node 18, such as operating system security, may be honored to supplement security supplied by proxy.

The access parameters in local proxy 52 apply to the user of submitting node 16 due to the translation from "MIKE@REMOTE" to "GUEST". Local proxy 52 includes an identifier 104 which corresponds with the local identifier 102 of remote proxy 50. Both remote proxy 50 and local proxy 52 include functional authorizations that define what functional authority submitting node 16 is granted to the storage and processing capabilities of processing node 18, as well as how that functional authority may be exercised. For example, a functional authority specified in remote proxy 50 or local proxy 52 may include an indication of whether submitting node 16 can upload, download, submit, run, or perform some other function or command at processing node 18. Additional information, such as directory specifications, command limitations, read/write limitations, storage or processing limitations, and others, may be supplied to further define how the authorized functions may be exercised.

An upload authorization 106 indicates whether the user of submitting node 16 may store information in memory 46 of processing node 18, and an upload directory 108 specifies a directory or other suitable memory location on processing node 18 that can store information received from the user of submitting node 16. Similarly, a download authorization 110 indicates whether the user of submitting node 16 may receive information stored in memory 46 of processing node 18, and a download directory 112 specifies a directory or other suitable memory location on processing node 18 that may be accessed by the user of submitting node 16 to receive information. If upload authorization 106 indicates authorization and upload directory 108 is not specified, then the user of submitting node 16 may store information in any portion of memory 46 of processing node 18 without restriction. Similarly, if download authorization 110 indicates authorization and download directory 112 is not specified, then the user of submitting node 16 may receive information stored in any portion of memory 46 of processing node 18 without restriction.

Local proxy 52 also includes a run directory 114 that specifies a directory or other suitable memory location in which the user of submitting node 16 can run programs, shell scripts, or other executables on processing node 18. Additional security can be maintained by prohibiting the user of submitting node 16 from issuing commands starting with a directory specifier, such as a slash (/) in a UNIX operating environment, and restricting commands to be in run directory 114. Furthermore, a system administrator may establish heightened security by closely managing the files and content of files maintained in run directory 114.

A submit directory 116 specifies the directory or other suitable memory location at processing node 18 in which the user of submitting node 16 can submit instructions or processes to processing node 18. For example, a set of instructions communicated from submitting node 16 and executed on processing node 18 may spawn an additional process having instructions to be executed on another processing node. The daisy-chain effect of submitting instructions within instructions may be encouraged, limited, or prevented depending on submit directory 116 specified in local proxy 52.

In one embodiment, local proxy 52 designated as "GUEST" applies generally to users of remote devices that desire access to processing node 18. If user-specific access parameters are desired, remote proxy 50 includes access parameters that take precedence over access parameters specified in local proxy 52. For the example illustrated in FIG. 2, upload authorization 118 of remote proxy 50 takes precedence over upload authorization 106 of local proxy 52, and uploading by the user of submitting node 16 is not authorized. Similarly, download directory 120 and run directory 122 in remote proxy 50 specify different directories that are accessible by the user of submitting node 16. Access parameters that are not specified in remote proxy 50 are established by entries in local proxy 52.

Some of the access parameters in remote proxy 50 and local proxy 52 specify a location in memory of the processing node, such as a directory specification, that is accessible to submitting node 16. For example, if the submitting node 16 desires to copy a file from processing node 18, then download authorization and download directory specifications in remote proxy 50 and local proxy 52 will be examined before the copy is performed. If the copy instruction specifies a directory that is not accessible by submitting node 16, then the instruction will not be executed. Similarly, submitting node 16 may desire to run a program at processing node 18. If the run instruction specifies a directory that is different from the run directory specification in remote proxy 50 or local proxy 52, then the instruction will not be executed. Although particular access parameters have been specified for remote proxy 50 and local proxy 52, it should be understood that the present invention contemplates any suitable access parameter that may be specified to manage the allocation of or access to the storage or processing capabilities of processing node 18.

The hierarchical structure of remote proxy 50 and local proxy 52 provide several technical advantages. For example, a general local proxy 52 for a group of users may be established to specify a baseline of access parameters. A more or less restrictive list of access parameters can then be maintained on a user-by-user basis using remote proxy 50. Identifier 100 of remote proxy 50 may be specified by submitting node 16 or the user of submitting node 16, thereby allowing access to processing node 18 using different identifiers associated with different proxies and different access parameters.

For example, the user of submitting node 16 may attempt to access processing node 18 using the identifier "JOE@REMOTE" instead of "MIKE@REMOTE." Since submitting node 16 may use processing node 12 to access other devices in system 10, the last part of identifier may be "REMOTE" (the name of processing node 12). Identifier 100 in remote proxy 50 may be specified indirectly in communications between submitting node 16 and processing node 18 or directly by an identification statement generated at submitting node 16. Furthermore, the user of submitting node 16 may specify an identifier that is local to processing node 18.

Furthermore, submitted node 16 may be subject to proxies maintained at both processing node 12 and 18. For example, submitting node 16 may desire to access the storage and processing capabilities of processing node 18. Submitting node 16 first accesses processing node 12 in accordance with the access parameters specified in a local proxy 38 associated with submitting node 16. If authorized by the access parameters specified in local proxy 38, submitting node 16 then attempts to access processing node 18 in accordance with one or a combination of remote proxy 50 and local proxy 52. Therefore, submitting node 16 may be subject to two levels of access parameters established by proxy at processing node 12 and at processing node 18. In this manner, a submitting node that desires to access a processing node through a number of intervening processing nodes may be subject to proxy security at each of the processing nodes in the communications chain.

Figure 3:
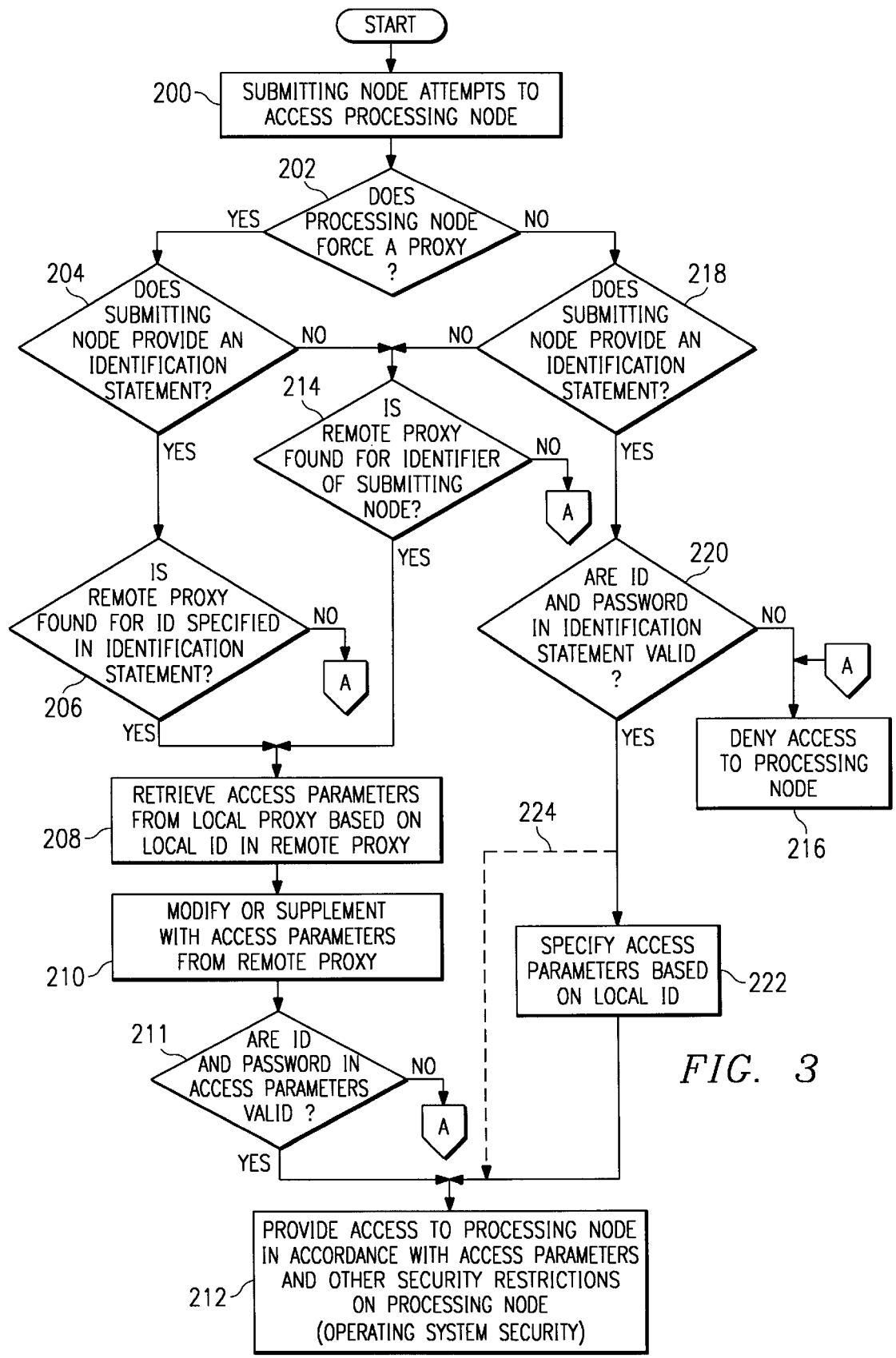
FIG. 3 illustrates a flow chart of a method for operating a data processing system constructed according to the teachings of the present invention.

FIG. 3 illustrates a flow chart of a method for operating system 10 according to the teachings of the present invention. Throughout this description, all references to submitting node 16 apply equally to a user of submitting node 16. The method begins at step 200, where submitting node 16 attempts to access processing node 18. As described above, this may be accomplished by first successfully obtaining access to processing node 12 in accordance with access parameters specified by local proxy 38.

If processing node 18 forces the retrieval of a proxy for submitting node 16 at step 202, then processing node 18 determines if submitting node 16 has provided an identification statement at step 204. An identification statement specifies an identifier and optionally a password for submitting node 16. If an identification statement is found in the instruction at step 204, then processing node 18 searches for a remote proxy 50 associated with information specified in the identification statement at step 206.

If a corresponding remote proxy 50 is found, then processing node 18 specifies access parameters for submitting node 16 based on local identifier 102 in remote proxy 50 at step 208. These access parameters may be retrieved from a local proxy 52 associated with local identifier 102. The access parameters in local proxy 52 are then supplemented or modified by access parameters specified in remote proxy 50 at step 210. Identification information from the established access parameters, such as a user identifier and optionally a password, is validated at step 211 using, for example, operating system security procedures. If identification information is validated at step 211, then submitting node 16 is provided access to processing node 18 in accordance with the established access parameters and other security restrictions on processing node 18, such as operating system security, at step 212. If identification information is not validated, then submitting node 16 is denied access to processing node 18 at step 216.

If submitting node 16 does not provide an identification statement at step 204, then processing node 18 searches for a remote proxy 50 associated with the identifier of submitting node 16 at step 214. This identifier may be specified indirectly or inherently in communications between submitting node 16 and processing node 18. If remote proxy 50 is found for the identifier, then processing node 18 establishes the access parameters for submitting node 16 at steps 208 and 210, and submitting node 16 is provided access at step 212. If remote proxy 50 is not found at steps 206 or 214, then submitting node 16 is denied access to processing node 18 at step 216.

If processing node 18 does not force the retrieval of a proxy for submitting node 16 at step 202, then processing node 18 determines if submitting node 16 has provided an identification statement at step 218. If no identification statement is found, then processing node 18 searches for a remote proxy 50 associated with the identifier of submitting node 16 at step 214, specifies access parameters at steps 208 and 210, and provides access at step 212.

If an identification statement is found at step 218, then the identifier and password in the identification statement are validated at step 220. If the identifier and password in the identification statement are valid at step 220, then access parameters are specified based on the identifier at step 222. Alternatively, upon furnishing a valid identifier and password, submitting node 16 may be granted access to processing node 18 without specifying access parameters, as indicated by arrow 224. Submitting node 16 is then provided access to processing node 18 at step 212. If the identifier and password in the identification statement are not valid at step 220, then the submitting node 16 is denied access to processing node 18 at step 216. It should be understood that granting access to processing node 18 upon submitting node 16 supplying a valid identifier and password may not be as secure as forcing access parameters to be established by proxy.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A data processing system, comprising:

a submitting node having an identifier;

a processing node coupled to the submitting node, the processing node having a memory operable to store a proxy associated with the submitting node, the proxy specifying a location in the memory of the processing node accessible by the submitting node, the processing node operable to receive the identifier of the submitting node and to provide the submitting node access to the processing node in accordance with the proxy; and a remote node coupled to the submitting node and the processing node, the remote node operable to receive the identifier of the submitting node and to communicate the identifier to the processing node.

2. The system of claim 1, wherein the identifier comprises a first identifier associated with the submitting node and a second identifier associated with the remote node.

3. The system of claim 1, wherein the identifier of the submitting node is included in a process to be executed at the location in the memory of the processing node specified by the proxy.

4. The system of claim 1, wherein the proxy comprises:

a remote proxy associated with the submitting node, the remote proxy having first access parameters and a local identifier for the submitting node; and a local proxy associated with the local identifier, the local proxy having second access parameters.

5. The system of claim 1, wherein the proxy comprises:

a remote proxy associated with the submitting node, the remote proxy having first access parameters and a local identifier for the submitting node;

a local proxy associated with the local identifier, the local proxy having second access parameters; and wherein the first access parameters from the remote proxy take precedence over the second access parameters from the local proxy.

6. The system of claim 1, wherein the proxy comprises:

a download directory specifying a location in the memory of the processing node operable to store files to send to the submitting node; and an upload directory specifying a location in the memory of the processing node operable to store files received from the submitting node.

7. The system of claim 1, wherein the proxy comprises:

a download authorization indicating that the submitting node may receive files stored at the processing node;

a download directory specifying a location in the memory of the processing node operable to store files to send to the submitting node;

an upload authorization indicating that the submitting node may store files at the processing node; and an upload directory specifying a location in the memory of the processing node operable to store files received from the submitting node.

8. A method for providing access to a processing node, comprising the steps of:

communicating an identifier from a submitting node to a remote node;

communicating the identifier from the remote node to the processing node;

retrieving a proxy stored at the processing node using the identifier, the proxy specifying a location in a memory of the processing node accessible by the submitting node; and providing the submitting node access to the processing node in accordance with the proxy.

9. The method of claim 8, wherein the identifier comprises a first identifier associated with the submitting node and a second identifier associated with the remote node.

10. The method of claim 8, wherein the identifier of the submitting node is included in a process to be executed on the processing node.

11. The method of claim 8, wherein the proxy comprises:

a remote proxy associated with the submitting node, the remote proxy having first access parameters and a local identifier for the submitting node; and a local proxy associated with the local identifier, the local proxy having second access parameters.

12. The method of claim 8, wherein the proxy comprises:

a remote proxy associated with the submitting node, the remote proxy having first access parameters and a local identifier for the submitting node;

a local proxy associated with the local identifier, the local proxy having second access parameters; and wherein the first access parameters from the remote proxy take precedence over the second access parameters from the local proxy.

13. The method of claim 8, wherein the proxy comprises:

a download directory specifying a location in the memory of the processing node operable to store files to send to the submitting node; and an upload directory specifying a location in the memory of the processing node operable to store files received from the submitting node.

14. The method of claim 8, wherein the proxy comprises:

a download authorization indicating that the submitting node may receive files stored at the processing node;

a download directory specifying a location in the memory of the processing node operable to store files to send to the submitting node;

an upload authorization indicating that the submitting node may store files at the processing node; and an upload directory specifying a location in the memory of the processing node operable to store files received from the submitting node.

15. A method for generating access parameters for a submitting node accessing a processing node, the method comprising the steps of:

retrieving a remote proxy associated with the submitting node, the remote proxy having a plurality of first access parameters and a local identifier for the submitting node;

retrieving a local proxy associated with the local identifier, the local proxy having a plurality of second access parameters; and generating access parameters for the submitting node using the first access parameters from the remote proxy and the second access parameters from the local proxy.

16. The method of claim 15, wherein the remote proxy is retrieved in response to an identification statement received from the submitting node.

17. The method of claim 15, wherein the first access parameters from the remote proxy take precedence over the second access parameters from the local proxy.

18. The method of claim 15, wherein the access parameters comprise:

a download directory specifying a location in the memory of the processing node operable to store files to send to the submitting node; and an upload directory specifying a location in the memory of the processing node operable to store files received from the submitting node.

19. The method of claim 15, wherein the access parameters comprise:

a download authorization indicating that the submitting node may receive files stored at the processing node;

a download directory specifying a memory location of the processing node operable to store files to send to the submitting node;

an upload authorization indicating that the submitting node may store files at the processing node; and an upload directory specifying a memory location of the processing node operable to store files received from the submitting node.

* * * * *